April 3, 1951 M. R. WINKLER 2,547,026

VIBRATING REED STRUCTURE

Filed Jan. 2, 1948 2 Sheets-Sheet 1

INVENTOR.
Marion R. Winkler
BY
Forman L. Mueller
Atty.

April 3, 1951 — M. R. WINKLER — 2,547,026

VIBRATING REED STRUCTURE

Filed Jan. 2, 1948 — 2 Sheets-Sheet 2

INVENTOR.

Marion R. Winkler

BY

Forman L. Mueller

Atty

Patented Apr. 3, 1951 2,547,026

UNITED STATES PATENT OFFICE 2,547,026

VIBRATING REED STRUCTURE

Marion R. Winkler, La Grange Park, Ill., assignor to Motorola, Inc., Chicago, Ill., a corporation of Illinois Application January 2, 1948, Serial No. 342

9 Claims. (Cl. 200—93)

This invention relates generally to vibrating reeds and more particularly to vibrating reed structures adapted to distinguish between closely adjacent frequencies as required in selective calling systems.

In various communication systems it is desired to provide equipment which can be used to advise one station that another station desires to communicate with it. Such equipment may be completely automatic, for example, and used to condition a receiver for operation when the proper signal is received thereby. Alternatively, the equipment may actuate a light or other signalling device to let an operator at the station know that another station is calling him. Although such equipment is well known for fixed stations use, suitable selective calling equipment is not available for use with mobile radio telephone communication systems. Presently available equipment designed for use in fixed stations is undesirably large and not sufficiently rugged for use with mobile equipment. Such equipment is also relatively complicated and expensive. To fill this need for mobile equipment, it has been proposed to use vibrating reed systems wherein the reed will have a natural frequency of vibration and will respond only to a particular frequency. To provide a satisfactory system the reed structures must be sufficiently selective that they will respond to the desired signal and only to the desired signal, being completely unresponsive to other calling signals on closely adjacent frequencies. The reeds, however, must be responsive over a sufficiently wide band so that they will respond when the calling signal differs from the natural frequency of the reed by a limited amount to thereby take care of the tolerance in the frequency of the calling signal.

It is, therefore, an object of the present invention to provide a small and compact vibrating reed structure adapted for use in selective calling systems used in connection with mobile communication equipment.

A further object of this invention is to provide an electrically driven reed structure which is highly selective and which may be adjusted to alter the selectivity characteristics thereof after assembly.

A still further object of this invention is to provide an electrically driven reed structure which is of inexpensive construction and which can be made to have very small frequency tolerances.

A feature of this invention is the provision of a reed structure including a very heavy mounting for a reed and electrical driving means therefor in which said heavy mounting is effective to stabilize the operating characteristics of the reed.

A further feature of this invention is the provision of a magnetic reed having magnet means adjacent the free end thereof and adjustable shunting means for altering the effectiveness of said magnet means.

A still further feature of this invention is the provision of a vibrating magnetic reed surrounded by a coil and a permanent magnet structure in which the magnet is of such strength that the reed responds to a desired band of frequencies but is completely unresponsive to frequencies differing from the natural frequency of the reed by a substantial amount.

Further objects, features and advantages will be apparent from a consideration of the following description taken in connection with the accompanying drawings in which.

Figures 1, 2, 5:
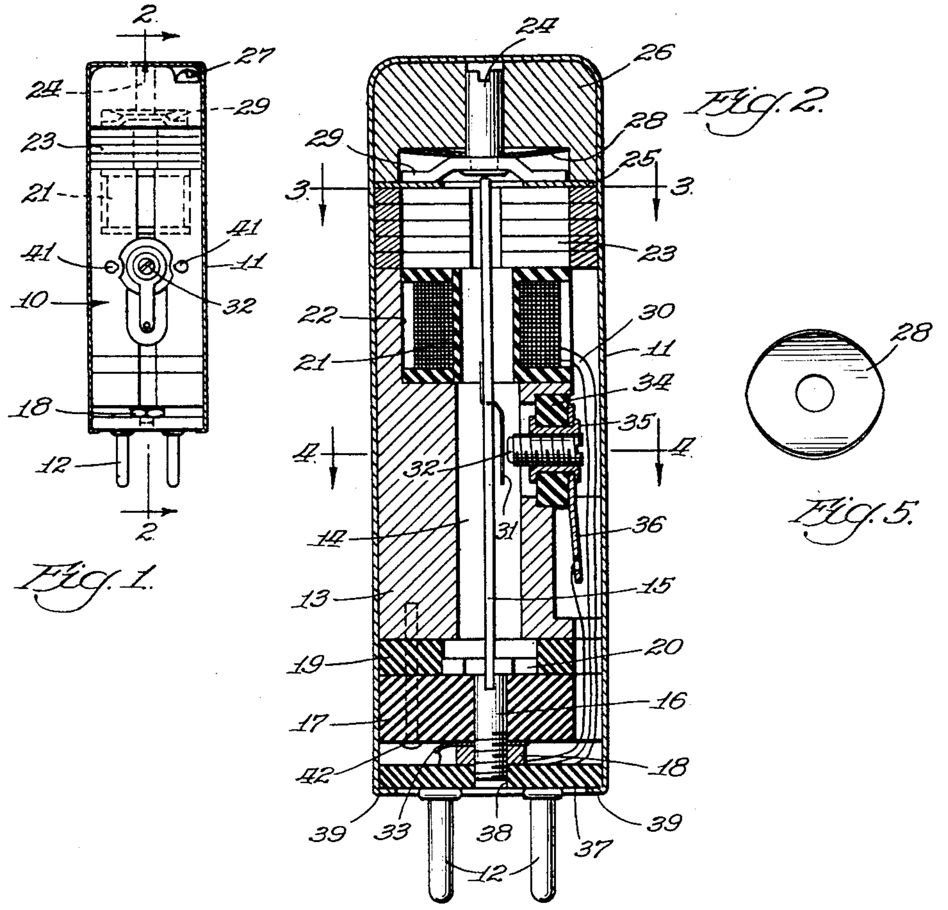
Fig. 1 is a front view of the reed structure in accordance with the invention.
Fig. 2 is a cross-sectional view along the lines 2—2 of Fig. 1.
Figure 4:
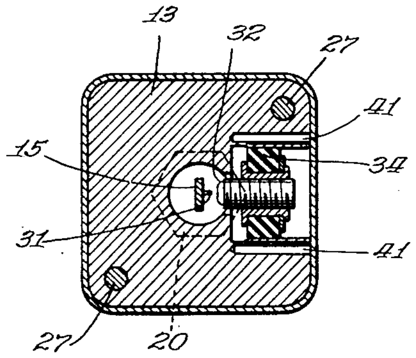
Figure 3:
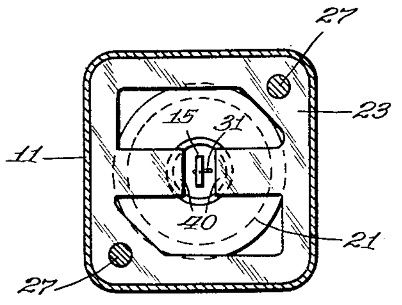

Figs. 3 and 4 are detailed views along the lines 3—3 and 4—4, respectively, of Fig. 2;

Fig. 5 illustrates the spring washer used in the reed structure; and

Figure 6:
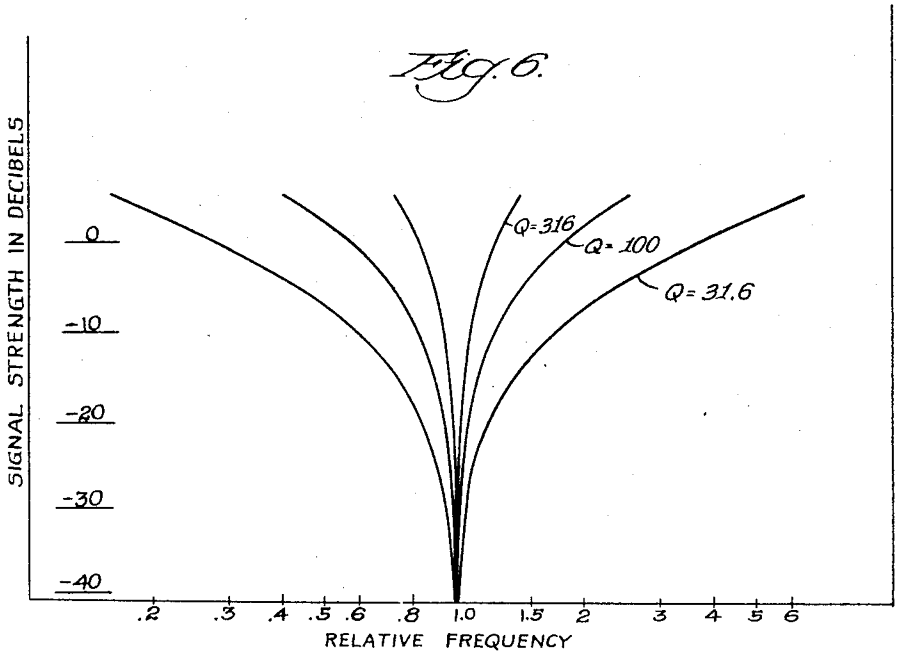
Figure 7:
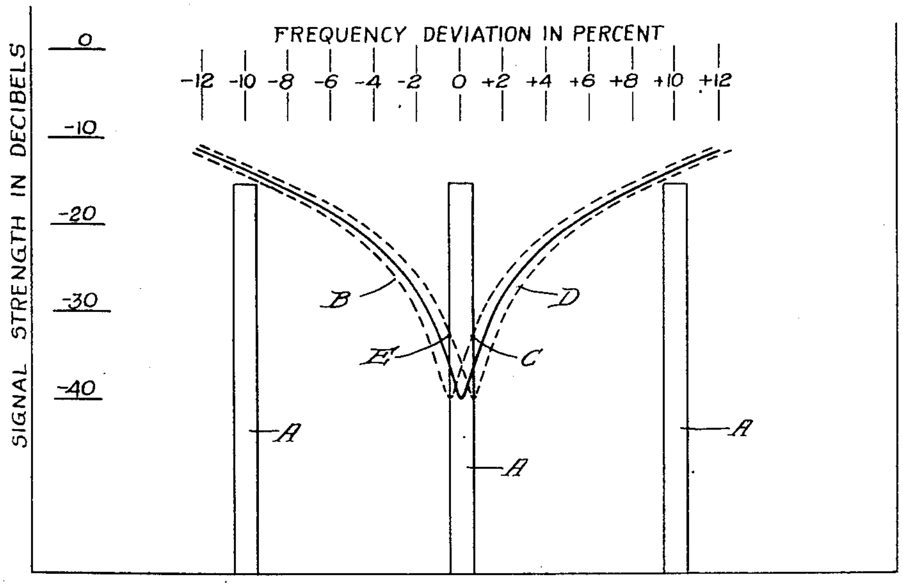

Figs. 6 and 7 are curve charts showing characteristics of the vibrating system.

In practicing the invention there is provided a base member having a central opening extending longitudinally therethrough. A magnetic reed is positioned in said opening being anchored to the member at one end and having the free end thereof extending from the member at the other end. A coil and a permanent magnet structure are positioned adjacent the free end of the magnet to cause vibration thereof. The reed includes a resilient contact adapted to intermittently engage an adjustable fixed contact on the supporting member when the reed vibrates. The dimensions of the reed are arranged so that it has a predetermined natural frequency. The magnet strength is such that the reed is sensitive to signals near the predetermined natural frequency but substantially insensitive to frequencies differing from the predetermined frequency. A cap is provided on the magnet including an adjustable shunt for varying the field of the magnet after the unit is assembled so that the selectivity of the reed structure can be adjusted. The base and cap are both made very heavy as compared to the vibrating reed and of such configuration that the center of weight thereof is near the vibrating portion of the reed.

Referring now to the drawings, in Fig. 1 there is illustrated a reed structure 10 enclosed in a shield can 11 and having plug-in terminals 12. The terminals 12 are adapted to support the reed structure mechanically and also provide electrical connections thereto. As best shown in Fig. 2, the reed structure includes a relatively massive base member 13 having a central opening 14 therein. A vibrating magnetic reed 15 is positioned in the opening 14, being supported by a mounting bolt 16 which is anchored to insulating member 17 by nut 18. A spacer 19 having a central opening adapted to surround the hexagonal portion 20 of the bolt 16 is positioned between insulating member 17 and the base member 13. Bolts 42 extending through the insulating member 17 and spacer 19 and threaded in the base member 13 hold the members in assembled relation. It is to be pointed out that the members 17 and 19 may be made of a single piece if such a structure is preferred. A coil unit 21 is provided in a recess 22 in the base member opposite to the reed mounting. For the purpose of providing a fixed magnetic field adjacent the vibrating magnetic reed 15, a magnet including a plurality of thin permanent magnet laminations 23 is provided having pole pieces adjacent the magnetic reed. Fig. 3 illustrates the configuration of the magnets and the position of the pole pieces 40 with respect to the reed 15.

For varying the effectiveness of the permanent magnet, an adjustable shunt structure 24 is provided adjacent the permanent magnet being separated therefrom by non-magnetic washer 25. The shunt 24 is positioned in an opening in the heavy cap 26 which is secured to the base member by bolts 27. It is to be noted that the bolts 27 also extend through the magnetic laminations 23 to properly position the magnet and secure the same in place. A resilient washer 28 is provided between the shunt 24 and cap 26 to hold the bridge portion 29 of the shunt against the non-magnetic washer 25. The shunt may be adjusted after the principal parts of the unit are assembled to adjust the operating characteristics of the vibrating system as will be explained. The shield 11, however, prevents adjustment of the shunt after complete assembly of the unit as adjustment by the user of the equipment is not expected.

The coil 21 of the reed structure may be connected in an electrical circuit to which selective calling signals are applied. When the coil 21 is energized at the natural frequency of the reed 15, the field produced by the coil will cooperate with the field of the permanent magnets and the reed will be caused to vibrate. The reed 15 includes a resilient contact 31 thereon which is adapted to engage the adjustable fixed contact 32. Therefore, when the winding 21 is energized by a signal of the frequency of the reed 15 and the reed is set in vibration, the resilient contact 31 will intermittently engage the fixed contact 32. The fixed contact can be adjusted so that contact will be made when the amplitude of vibration of the reed reaches any desired amount. The adjustable fixed contact 32 is insulated from the base member by insulating washer 34 which has a central opening in which a bushing 35 is secured. The bushing includes threads for receiving the adjustable fixed contact 32 and permitting adjustable positioning of the same. A cross-sectional view taken through the adjustable fixed contact and mounting therefor is shown in Fig. 4. The insulating washer 34 may be held in place in the base 13 by any suitable means as by punching holes 41 in the base adjacent the washer 34 so that a portion of the base is wedged against the insulating washer to stake the washer in place. A terminal clip 36 is connected to the bushing 35 for making electrical contact thereto.

Connections are made to the coil 21, the resilient contact 31 and fixed contact 32 through the plug-in terminals 12. The coil 21 is connected to a pair of the terminals 12 so that the coil can be energized by the calling signal. The resilient contact 31 is connected through magnetic reed 15 and the mounting bolt 16 to clip 33 which may be connected to another one of the plug-in terminals 12. The terminal clip 36 is connected to the fourth plug-in terminal 12 so that intermittent engagement of contacts 31 and 32 may be used to operate a control system in any desired manner. The terminals 12 are secured in an insulating block 37 having a central opening 38 therein which fits about the end of the reed mounting bolt 16 to position the block with respect to the reed structure. The shielding can 11 has spun over edges 39 which engage the edges of the terminal block to thereby hold the block rigidly in place.

As previously stated, the vibrating reed is made of magnetic material so that the fields produced by the permanent magnets 23 and the coil 21 will cause vibration thereof. The vibrating reed must also be made of a material which is not substantially affected by temperature so that the natural frequency of the reed will not change in the presence of varying temperature conditions. Suitable magnetic materials are now available which have sufficiently small temperature coefficients of expansion that they are substantially unaffected by changes in temperature. By changing the thickness of the reeds the natural frequency of vibration thereof will be changed and by selecting reeds of different thicknesses, a plurality of reeds which respond to predetermined frequencies can be provided.

It is important in certain applications of such reeds, as in selective calling systems, that the selectivity of the reed be held in certain limits. The selectivity of the vibrating system depends upon the quality of the system and is completely analogous to electrical oscillating systems in which the selectivity depends upon the quality or Q of the circuit. As the vibrating system is adapted for use in connection with radio equipment, it is believed that the use of Q in an entirely analogous sense to define the characteristics of the vibrating system will be helpful. The Q of an oscillating system is proportional to the ratio of the energy stored in the system to the energy loss per cycle in the system.

$$Q=2\pi\frac{\text{energy stored}}{\text{energy lost per cycle}}$$

This definition is well understood by radio engineers and may be found in many modern radio handbooks. It is obvious that this definition applies to mechanically oscillating systems as to oscillating circuits. With reference to mechanical systems, Q as hereinafter used designates generally the same characteristic which is usually referred to in mechanical systems as the ratio of the damping C in a vibration system to the critical damping Cc of the system. In order to convert values it is pointed out that the Q of a system is equal to one-half the reciprocal of the ratio of damping to critical damping or, $$Q=\frac{1}{2}\left[\frac{1}{\left(\frac{C}{Cc}\right)}\right]$$

More specifically, for use in selective calling equipment it may be desired that reeds be provided which will respond over a frequency range which deviates plus and minus 1 per cent from the natural frequency of the reed. Such a band may be required to compensate for deviation of the calling signal from the predetermined frequency which may be as much as 0.5 per cent and for tolerance in the reed itself which may also result in frequency deviation of as much as 0.5 per cent. A total deviation of 1 per cent is, therefore, possible, and the reed must respond to a band of frequencies of this width in order for it to operate when the corresponding calling signal is applied. In order to use as many different frequencies as possible within a given range of frequencies so that a plurality of different calling signals may be provided, it is desired that the reeds be highly selective so that each reed will not respond to a frequency differing substantially from the predetermined frequency on which it is to operate. It has been found that for satisfactory operation, reed structures must be provided which will require an increase in signal strength of about 20 decibels to actuate the reed when the frequency supplied thereto differs by 10 per cent from the natural frequency of the reed.

Tests have indicated that to obtain the above selectivity the reed should have a Q of approximately 100, this value being optimum for providing the required frequency band and the desired selectivity beyond the band. Fig. 6 shows a family of curves indicating the response of reed structures having Q's of different values. It is to be noted that the maximum sensitivity at the natural frequency of the reed does not depend on the Q but that the selectivity does depend on the Q. The range of Q's as illustrated in Fig. 6 can be obtained with the same reed by using magnets of different strength and by changing the position of the pole pieces of the magnet with respect to the reed. In the structure above described the magnet strength can be varied by adjusting the movable shunt so that the Q is variable through a limited range after the structure has been completely designed. As the Q varies with the position of the pole pieces with respect to the reed, it is obvious that the Q varies with amplitude of vibration since at large amplitudes, the reed comes closer to the pole pieces.

Fig. 7 illustrates the operation of a reed having a Q of 100 in a system in which channels are spaced so that the channel spacing is substantially 10% of the operating frequency. The pedestals marked A represent signals on adjacent channels which will vary in operation through a range of 0.5 per cent. The solid curve illustrates the characteristic of a reed exactly on frequency and the dotted curves illustrate the characteristic of reeds having a maximum error of plus or minus 0.5 per cent from the natural frequency. It is apparent that in such an arrangement the reeds will respond to signals varying from minus 15 to minus 35 decibels. At minus 35 decibels a reed having maximum negative error (curve B) will just respond to a signal of maximum positive error, as indicated at point C. Similarly a reed of maximum positive error (curve D) will just respond to a signal of maximum negative error as indicated at point E. It is also noted that the reeds will not respond to the adjacent channels unless signals stronger than minus 15 decibels are applied to provide high selectivity. The average operating range in such a system could be set at approximately minus 25 decibels so that for signals weaker or stronger the system would still operate satisfactorily through relatively wide ranges.

In order to provide reeds which have frequency tolerances as low as 0.5 per cent under all operating conditions, various factors must be controlled. The actual physical dimensioning of the reed is of major importance but this factor can be easily and accurately controlled. As previously stated, the temperature characteristics of the material from which the reed is made is important and only materials having small temperature coefficients of expansion may be used. Another factor which is very important is the mounting of the reed so that energy is not absorbed thereby. This is provided in the present system by use of a very heavy base and cap structure which provides a rigid support for the reed regardless of the manner in which the reed structure is mounted in the equipment in which it is used. It is obvious that the effective mass of the mounting can be increased by clamping the same to other components but in such case the effective mass depends upon the firmness of the clamping means and it is therefore more desirable to provide the mass in the unit itself. The mass of the mounting is positioned to be most effective and is of such magnitude as compared to the mass of the reed to prevent loss or absorption of energy due to a free mounting. It has been found that if the mass of the base and cap is 150 times that of the reed and if the mass is distributed as in the structures illustrated, frequency errors due to mounting of the structure on a chassis and due to the mounting of the reed on the base and other mechanical variations in the structure can be held to 0.2 per cent. The ratio of masses of 150 to 1 has been found to be relatively critical as higher ratios have not substantially increased the frequency variation, and smaller ratios have resulted in frequency variations which are much larger.

The characteristics of the mounting of the reed in addition to affecting the frequency thereof as specified above also affects the sensitivity. As the free mounting results in absorption of energy, the amplitude of vibration is reduced thereby. This results in a loss of sensitivity as a certain minimum amplitude of vibration is required for the resilient contact on the reed to engage the fixed contact. As the Q of the reed depends on the amplitude of vibration as specified above, the freedom of mounting, therefore, also indirectly affects the Q.

When using reed structures of the same configuration for various frequencies in a range of frequencies, it is necessary to provide reeds of different thicknesses. This obviously results in reeds having different masses. As the high frequency reeds have the greatest mass the problem of providing a sufficiently heavy mounting is greater than in the lower frequencies. However, reed structures in accordance with the invention have been found to operate satisfactorily at frequencies up to 450 cycles per second. In structures tested, a reed for operation at 450 cycles had a thickness of 50 thousandths of an inch and a mass of .046 ounce. The mass of the remainder of the structure, that is, the fixed portion of the structure, was 7.2 ounces providing a ratio of 157 to 1. The frequency tolerance, sensitivity, and selectivity of the reed were within the requirements as specified above.

It is seen from the above that I have provided a reed structure which is of relatively simple construction and which can, therefore, be easily manufactured. The structure is such that the desired sensitivity and selectivity can be obtained without the use of very close tolerance which would make manufacture thereof expensive. Means is provided for adjustment of the selectivity after the principal components of the unit are assembled so that the desired operating characteristics can be obtained.

While I have described a particular embodiment of my invention which is illustrative thereof, it is apparent that various changes and modifications can be made therein without departing from the intended scope of the invention as defined in the appended claims.

I claim:

1. A vibrating reed structure comprising a heavy longitudinally extending base member having a central opening therein, a magnetic reed supported on said member at one end and extending through said opening to the other end thereof, a coil positioned in said opening in said member adjacent said other end, laminated permanent magnet means supported on said member at said other end and having pole pieces positioned adjacent and on substantially opposite sides of said reed, a resilient contact member on said reed, an adjustable fixed contact on said base member adapted to be engaged by said resilient contact when said reed vibrates, a heavy cap secured on said magnet means and including an adjustable shunt for varying the effective strength of said magnet means.

2. A vibrating reed structure including in combination, a heavy elongated base member having a central longitudinally extending opening therein, a magnetic reed supported on said base member at one end and extending through said opening to the other end thereof, a coil positioned in said opening in said base member adjacent said other end, permanent magnet means supported on said base member at said other end and having pole pieces positioned adjacent and on substantially opposite sides of said reed, a resilient contact member on said reed, an adjustable fixed contact on said base member adapted to be engaged by said resilient contact when said reed vibrates, a heavy cap secured on said magnet means and including an adjustable shunt for varying the effective strength of said magnet means, and a housing for said structure comprising a shielding portion and a mounting portion having terminals for supporting said structure and for making electrical connections to said coil and said contacts.

3. A vibrating reed structure comprising a heavy elongated base member having a central longitudinally extending opening therein, a magnetic reed supported on said base member at one end and extending through said opening and having a free end extending from the other end of said base member, a coil positioned in said opening in said base member adjacent said other end thereof, a magnet means supported on said member at said other end including a permanent magnet portion and having pole faces positioned adjacent and on substantially opposite sires of said free end of said reed, a resilient contact member on said reed, an adjustable fixed contact on said base member adapted to be engaged by said resilient contact when said reed vibrates, and a heavy cap rigidly secured on said magnet means, said base member, magnet means and cap together having a mass at least 150 times that of said reed with the center of said mass being between the center and the free end of said reed.

4. A vibrating reed structure including in combination a heavy elongated base member, a magnetic reed extending substantially parallel to said base member, said reed being supported on said base member at one end and having the other end thereof free to vibrate, a coil positioned on said base member adjacent said free end of said reed, magnet means supported on said base member including a permanent magnet portion and having pole faces positioned adjacent and on substantially opposite sides of said free end of said reed for providing a magnetic field about said reed, a resilient contact member on said reed, an adjustable fixed contact on said base member adapted to be engaged by said resilient contact when said reed vibrates, means secured on said magnet means and including an adjustable shunt for modifying the effective field at said pole faces so that said reed is caused to vibrate in response to signals applied to said coil which are of a predetermined minimum strength and which differ from the natural frequency of said reed by less than 1%, said field being of such strength that said reed will vibrate in response to signals differing from said natural frequency by 10% only when said signals exceed said minimum strength by more than 20 decibels.

5. A vibrating reed structure including in combination, a heavy solid elongated base member having a central longitudinally extending opening therein, a magnetic reed extending through said opening in said base member, mounting means secured to one end of said base member supporting said reed at one end thereof with the other end of said reed being free to vibrate, said reed extending entirely through said opening in said base member with the free end thereof projecting a limited distance beyond said base member at the end thereof opposite to said one end, a coil positioned in said opening in said base member at said opposite end thereof and aligned therein, permanent magnet means supported on said base member at said opposite end thereof having pole portions positioned adjacent and on substantially opposite sides of said free end of said reed, said magnet means having a portion extending completely around said free end of said reed for shielding the same, a resilient contact supported on said reed, and a fixed contact adjustably positioned on said base member in a position to be engaged by said resilient contact when said reed vibrates.

6. A vibrating reed structure for use on the chassis of electronic apparatus which has a receptacle for receiving said reed structure including in combination, a compact heavy base member, a magnetic reed, mounting means secured to one end of said base member supporting said reed at one end thereof with the other end being free to vibrate, a coil positioned on said base member, magnet means supported on said base member at the other end thereof including a permanent magnet portion and having pole portions and positioned adjacent and on substantially opposite sides of said free end of said reed, a resilient contact supported on said reed, a fixed contact adjustably positioned on said base member in a position to be engaged by said resilient contact when said reed vibrates, a heavy cap secured to said magnet means, said complete reed structure having a mass at least 150 times the mass of said reed with the center of mass of said complete structure being between the center and free end of said reed, and a housing for said structure comprising a shielding portion and a mounting portion which includes terminals for supporting said structure in said receptacle in said chassis and for making electrical connections to said coil and said contacts.

7. A vibrating reed structure for use on the chassis of electronic apparatus which has a receptacle for receiving said reed structure including in combination, a heavy elongated base member having a central longitudinally extending opening therein, a magnetic reed extending through said opening in said base member, mounting means secured to one end of said base member supporting said reed at one end thereof with the other end being free to vibrate, said reed extending entirely through said opening in said base member with the free end thereof projecting a limited distance beyond said base member at the end thereof opposite to said one end, a coil positioned in said opening in said base member at said opposite end thereof with said coil being coaxial with said opening, magnet means supported on said base member at said opposite end thereof including a permanent magnet portion and having pole faces positioned adjacent and on substantially opposite sides of said free end of said reed, said magnet means having a portion extending completely around said free end of said reed for shielding the same, a resilient contact supported on said reed, a fixed contact adjustably positioned on said base member in a position to be engaged by said resilient contact when said reed vibrates, and a housing for said structure comprising a shielding portion and a mounting portion which includes terminals for supporting said structure in said receptable in said chassis and for making electrical connections to said coil and said contacts.

8. A vibrating reed structure for use on the chassis of electronic apparatus which has a receptacle for receiving said reed structure including in combination, a heavy elongated base member having a central longitudinally extending opening therein, a magnetic reed extending through said opening in said base member, mounting means secured to one end of said base member supporting said reed at one end thereof with the other end being free to vibrate, said reed extending entirely through said opening in said base member with the free end thereof projecting a limited distance beyond said base member at the end thereof opposite to said one end, a coil positioned in said opening in said base member at said opposite end thereof, magnet means supported on said base member at said opposite end thereof including a permanent magnet portion and having pole faces positioned adjacent and on substantially opposite sides of said free end of said reed, said magnet means having a portion extending completely around said free end of said reed for shielding the same, a resilient contact supported on said reed, a fixed contact adjustably positioned on said base member in a position to be engaged by said resilient contact when said reed vibrates, a heavy cap secured to said magnet means, said complete reed structure having a mass at least 150 times the mass of said reed with the center of mass of said complete structure being between the center and the free end of said reed, and a housing for said structure comprising a shielding portion and a mounting portion which includes terminals for supporting said structure in said receptacle in said chassis and for making electrical connections to said coil and said contacts.

9. A frequency selective vibrating reed structure, including in combination, compact heavy elongated base means, a magnetic reed extending substantially parallel to said elongated base means, mounting means secured to said base means and supporting said reed at one end thereof with the other end of said reed being free to vibrate, a coil positioned about said reed adjacent said other end thereof, magnet means supported on said base means including a permanent magnet portion and having pole portions positioned adjacent and on substantially opposite sides of said other end of said reed, a fixed contact adjustably positioned on said base means, a fine flexible wire supported on said reed forming a resilient contact engaging said fixed contact when said reed vibrates, said base means having a mass at least 150 times that of said reed with the center of mass of said base means being between the center and free end of said reed, whereby said base means forms a substantially fixed support for said magnetic reed and engagement of said contacts provides a resilient mechanical connection between said magnetic reed and said base means.

MARION R. WINKLER.

REFERENCES CITED

The following references are of record in the file of this patent:

UNITED STATES PATENTS

| Number | Name | Date |
|---|---|---|
| 1,656,250 | Thompson et al. | Jan. 17, 1928 |
| 1,671,245 | Kraus | May 29, 1928 |
| 2,043,746 | Garstang | June 9, 1936 |
| 2,471,594 | Weightman | May 31, 1949 |
| 2,473,353 | Aust | June 14, 1949 |
| 2,486,394 | Eannarino | Nov. 1, 1949 |

FOREIGN PATENTS

| Number | Country | Date |
|---|---|---|
| 600,972 | France | Nov. 21, 1925 |